(12) United States Patent
Bellow (10) Patent No.: US 10,517,269 B2
(45) Date of Patent: Dec. 31, 2019

(54) GRAVITY FLOW FEEDER

(71) Applicant: Ray Bellow, Opelousas, LA (US)

(72) Inventor: Ray Bellow, Opelousas, LA (US)

( * ) Notice: Subject to any disclaimer, the term of this patent is extended or adjusted under 35 U.S.C. 154(b) by 0 days.

(21) Appl. No.: 16/222,202

(22) Filed: Dec. 17, 2018

(65) Prior Publication Data

US 2019/0116756 A1   Apr. 25, 2019

Related U.S. Application Data

(62) Division of application No. 15/187,280, filed on Jun. 20, 2016, now Pat. No. 10,188,078.

(51) Int. Cl.
*A01K 5/02*     (2006.01)

(52) U.S. Cl.
CPC .......... *A01K 5/0291* (2013.01); *A01K 5/0225* (2013.01)

(58) Field of Classification Search
CPC ....... A01K 5/0291; A01K 5/0225; A01K 5/02
See application file for complete search history.

(56) References Cited

U.S. PATENT DOCUMENTS

| | | | |
|---|---|---|---|
| 3,717,127 A * | 2/1973 | Porterfield | A01K 5/0258 119/57.7 |
| 6,135,056 A | 10/2000 | Kuo | |
| 8,096,265 B1 | 1/2012 | Wisecarver | |
| 9,301,495 B1 | 4/2016 | Bogart | |
| 2013/0192527 A1 | 8/2013 | Reid | |

* cited by examiner

*Primary Examiner* — Monica L Williams
(74) *Attorney, Agent, or Firm* — William W. Stagg (57) ABSTRACT

A gravity flow feeder is disclosed having a vertically arranged canister, funnel, chute, and trough arrangement wherein feed contained within each canister is allowed to flow down, aided by gravity, to settle within a feed trough. Use of a timing mechanism and a pneumatic or hydraulic cylinder allows for the articulation of a closeable access to open or close the trough in order to protect the feed contained from the elements and scavenging animals and condition the timing of animal arrival at the feeder. Any number of feed containing canisters may be implemented in order to provide for mixing of various types of feed within the trough for maintenance of a balanced diet for desired animals.

8 Claims, 6 Drawing Sheets

GRAVITY FLOW FEEDER

PRIORITY

This application is a divisional application under 37 CFR 1.53(b) entitled "Gravity Flow Feeder". The pending prior application is Ser. No. 15/187,280 filed Jun. 20, 2016 by applicant for "Gravity Flow Feeder", the entire contents of which are hereby incorporated by reference. This application claims priority to prior application Ser. No. 15/187,280.

FIELD OF THE INVENTION

The herein disclosed invention pertains to a gravity induced animal feeding device. More specifically, the invention pertains to an animal feed dispenser where feed is produced without falling to the ground to prevent waste of feed and which does not attract hogs or other wild varmints.

BACKGROUND

Deer feeders are a common feature in the hunting industry. Many people prefer to set out a feeder in hopes of attracting and settling deer in a hunting area during the winter or other hard times so as to have a deer population present during the hunting season. Over the years, automated feeders have been developed which are intended to automatically feed a small quantity of feed, typically corn, upon the ground over a limited area around the feeder over time. Such feeders are often wind powered or powered by small electric devices using common batteries for operation. Once properly installed above an area through which deer traverse, deer will become accustomed to the feeder and receiving food from it and will be attracted and incentivized to stay in the hunting area.

While such feeders are somewhat effective, they do suffer a number of disadvantages. For example, scavenging animals, other than deer, are also attracted to the feeders, requiring that the feeder must be suspended or elevated at sufficient height as to prevent hog, squirrels, and other undesired animals from directly accessing the feed container. Due to such height, feeders are often difficult and inconvenient to load. Further, typical feeders which deposit feed directly upon the ground attracts hogs and other wild animals to the area. This presents a serious problem as, in addition to such animals eating valuable feed intended for deer consumption, hogs and other animals can scare away deer defeating the purpose of the deer feeder.

As well, deer feeders are generally designed with large barrels or tanks in which large amounts of feed can be stored for delayed production over time. Storage of large quantities of feed, typically enough to last several months, reduces the interaction of a hunter with the area which in turn prevents the chance of the hunter scaring off a deer population. During the off-season months it is advantageous to hunters to keep the deer population healthy and well fed in anticipation of the beginning of the hunting season. As such, many hunters prefer to mix feed such as corn, soy beans, rice bran, or commercial animal feed like sweet feed to maintain the deer population. Yet, mixing feed prior to depositing in the feeder container is time consuming and many times does not entirely mix together, leaving sections of the container with more feed than the other.

Feeder actuators, whether they are wind activated or set to articulate upon an electric signal from a timer, must be reliable. Deer are sensitive to their environment and any unknown noise or motion may cause them to flee. The whirring sound of an electric motor or the sudden spinning motion of a dispenser often times will spook the deer into fleeing the area, seriously jeopardizing game traffic along a game trail. Furthermore, where the dispenser mechanism requires contact with an animal, it usually must be hung at a lower location where the deer can reach and easily contact it. However, the lower a feeder is hung, the easier it becomes for squirrels, hogs, and other animals to contact it, using up the feed.

Even more so, producing feed by wind articulation or electronically timed triggering supplies feed at times when deer are not present to be attracted and does not condition the deer to come to the feeder at desired times. Rather the feed is produced upon the ground wherein the deer can eat at their leisure. Deer are foragers inclined to remain safely hidden during daylight hours, only straying from their protection during twilight and evening when they are less exposed to be preyed upon by predators. This creates a serious problem where a hunter would prefer the deer to arrive at the hunting area during daylight hours, the regulated hours reserved for hunting which are strictly enforced by each state's Department of Wildlife and Fisheries. Thus, it is advantageous that deer be conditioned to eat at a feeder at preferred times.

In light of such disadvantages in typical game feeders, there is presently a need for a feeder which operates to condition deer to arrive at the feeder at desired times and which provides for proper mixing of feed and feeding of a deer population in a quiet and efficient manner without the necessity of depositing the feed upon the ground.

SUMMARY OF THE INVENTION

The present invention is directed to a gravity flow feeder which provides an easy and efficient means of conditioning desired animals to a feeding schedule without the unnecessary waste of ground dispersal feeding. Generally, the gravity flow feeder comprises at least one feed canister with a narrow funnel and chute affixed vertically below to allow gravity to pull feed from the canister and into an enclosed feed trough.

The trough is arranged below the chute so that the feed canister, funnel, chute, and trough are in a vertically successive downward arrangement as to allow feed to pass downward there through by gravity alone. The trough is further arranged with a slight downward angle to allow feed to slide down and settle within, progressively filling the empty cavity space of the trough. Additionally, the trough is configured to contain and prevent feed from sliding out and onto the ground. A pivotally articulable access door is provided on the trough, which, in conjunction with an affixed pneumatic or hydraulic cylinder, may be opened and closed at desired times as specified by a user to allow desired animals to approach and consume the contained feed.

A timing mechanism, such as an analog or digital timer, may be provided to send signals to the cylinder to allow for automatic opening and closing of the trough access without the necessity of user interaction, which could disturb and scare off the animals sought to be attracted. The gravity flow feeder may further be arranged with multiple canisters with interconnected funnels and chutes to promote the mixing of the feed supplies contained in the canisters as the feed is pulled by gravity into the lone trough.

The feeder may be arranged and supported upon the ground by fixedly attaching it to a support bar, wherein multiple canisters may be further attached and fastened to each other upon the support bar by means of cross members.

The support bar may be adjustable and fitted with adaptable legs in order to support the feeder at a desired height upon the ground. The feeder may alternatively be suspended by means of cables or line as to allow for the feeder hang in position at such desired height.

The gravity flow feeder is advantageous as it allows for a user to set a desired time for the feed containing trough to open and close so that desired animals may be attracted and conditioned to approach the area of the feeder at particular times. The interconnected vertical arrangement of the multi-canister embodiment naturally mixes the contained feed by the natural flow of gravity into the trough. The feeder is further beneficial in preventing waste of feed by the conventional means of ground dispersal, wherein the dispersed feed may be eaten by undesired animals such as hogs or other varmints.

These and other objects, advantages, and features of this invention will be apparent to those skilled in the art from a consideration of this specification, including the claims and drawings herein.

DESCRIPTION OF THE INVENTION

Figure 1:
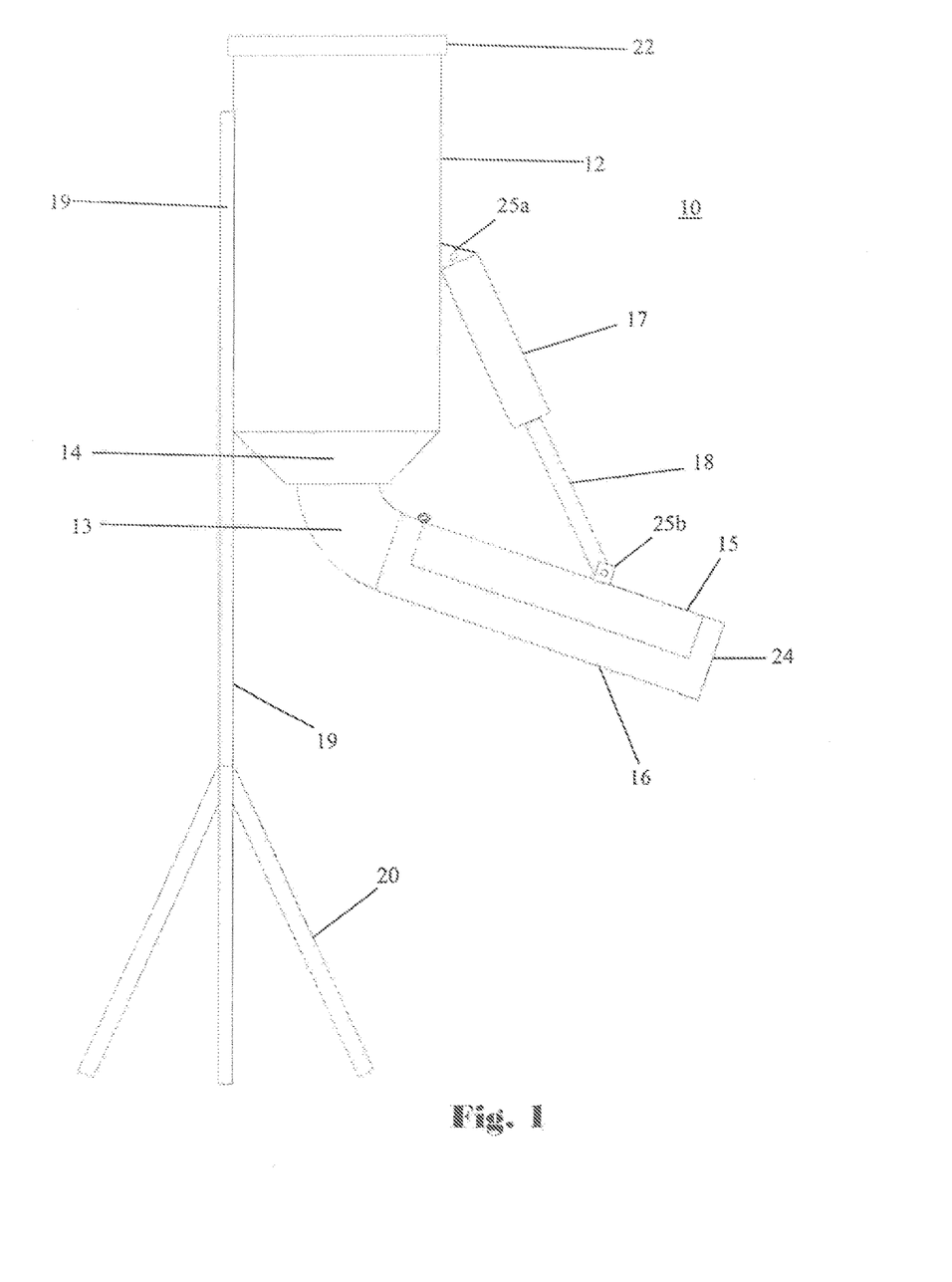
FIG. 1 is a side view of a gravity flow feeder of the present invention in its closed position.

Referring now to the drawings and, more particularly to FIG. 1, there is shown a side view of the gravity flow feeder 10 configured in its closed position. Generally, the gravity flow feeder 10 comprises a feed canister 12 vertically affixed to a trough 16 by a funnel 14 and curved chute 13. Such vertical orientation of the canister 12 in relation to trough 16 allows for gravity to naturally pull feed through funnel 14 and chute 13 to finally settle within trough 16.

Canister 12 is envisioned as a hollow substantially cylindrical container in which animal feed may be stored. A canister lid 22 is provided for allowing canister 12 to be opened near its top for deposit of feed within canister 12. Canister 12 may be closed by affixing the lid 22 upon canister 12 by means of screw top, plug and hole, snap fit, or other engagement conventional in the art. Providing lid 22 allows for easy allocation of feed within canister 12 while protecting the contained feed from exposure to the elements and scavenging by wild animals.

Funnel 14 is provided at the bottom of canister 12 with an inwardly tapered surface in order to direct the passage of feed from the larger dimensioned canister 12 into chute 13. Chute 13 is generally cylindrical and further designed with a curvature to project the trough 16 outward at a desired horizontal angle from the vertical axis of canister 12. The limited size of both funnel 14 and chute 13 are provided for restricting the amount of feed passing from canister 12 and there through into trough 16 to allow for only desired quantities of feed to be fed into trough 16.

Trough 16 is a generally cylindrical container comprised of an upper end affixed to chute 13, a pivotal access 15, an internal cavity 23, and an upward projecting lip 24 at its lower end. Cavity 23 is designed with a smooth inner surface to promote the sliding of feed within, wherein the upward projection of lip 24 provides an end to trough 16 wherein feed sliding within trough 16 may abut and back up within cavity 23 filling the trough 16. Trough 16 is oriented at a slight downward angle as to promote the sliding and settling of feed within trough 16 by gravity. As animal feed is fed down through canister 12, through funnel 14 and chute 13, and into cavity 23 of trough 16, the feed will be stopped by lip 24 and back up inside the trough 16, wherein the pressure of the settled feed within trough 16 will press back against the flow of feed from canister 12, causing the cessation of gravity feeding.

Figure 3:
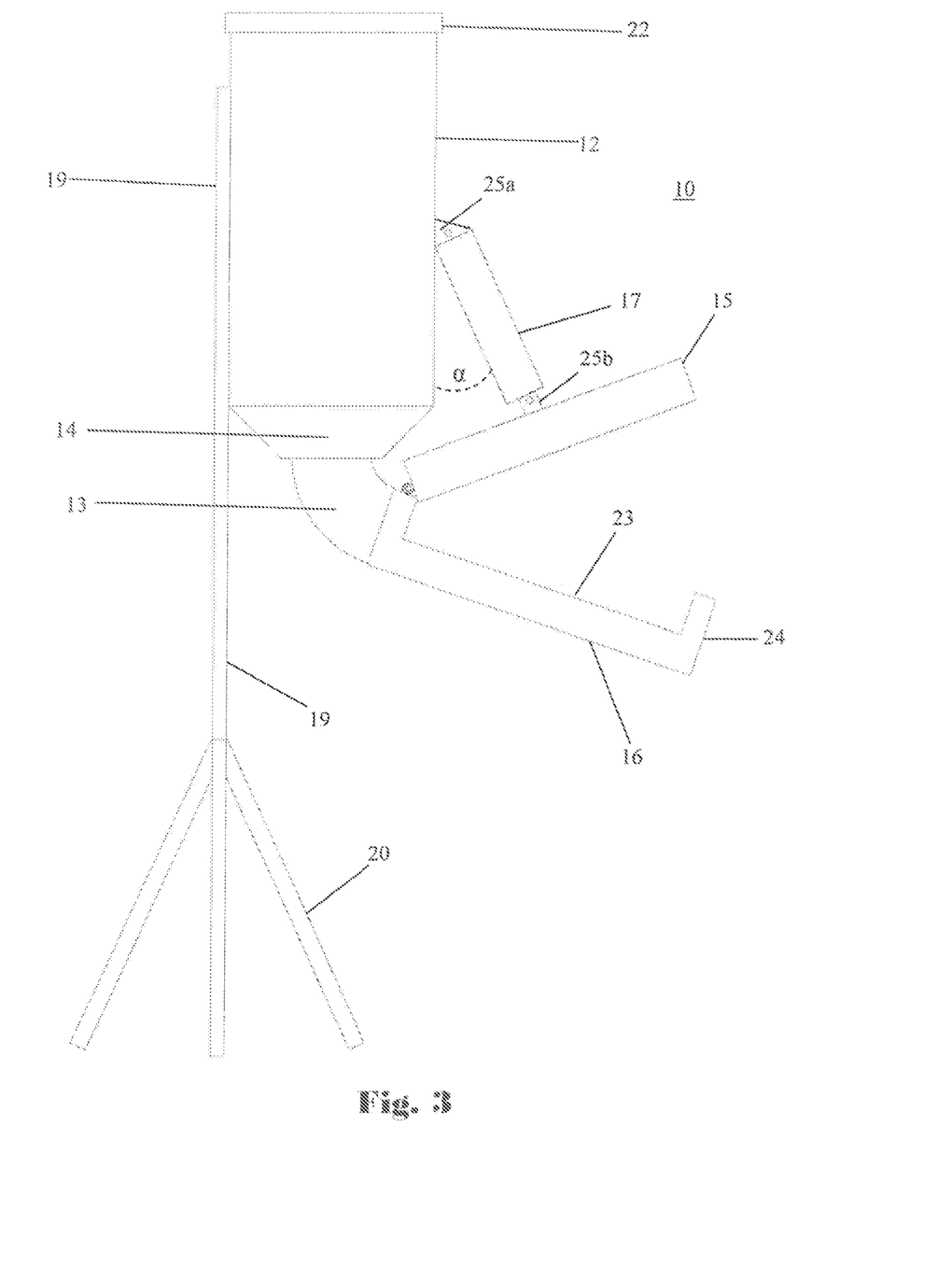
FIG. 3 is a side view of the gravity flow feeder as shown in FIG. 1 in its open position.

Now referring to FIG. 3, access 15 is pivotally attached to trough 16 above cavity 23 by a hinge 11 as to allow for the opening and closing of cavity 23 and thus the respective uncovering and securing of the feed housed within. To facilitate the opening and closing of access 15 an articulating cylinder 17 and internal piston 18 are provided which are pivotally affixed between canister 12 and access 15 by means of pivotal hinges 25a and 25b. It is envisioned that cylinder 17 could be driven by pneumatic or hydraulic internal cylinder pressures and could operate as a single or double acting cylinder. By retraction of internal piston 18 into cylinder 17, access 15 will be drawn upward, pivoting upon hinge 11, to expose cavity 23 of trough 16 and thus reveal the feed contained within trough 16. Inversely, extension of piston 18 out of cylinder 17 will drive the access 15 downward to close the access 15 over cavity 23 thus securing the feed within trough 16 from the elements and undesired animals. Pivotal hinges 25a, 25b allow for cylinder 17 and piston 18, respectively, to pivot in reaction to the articulation of piston 18 moving into and out of cylinder 17 which in turn causes access 15 to open or close, thus causing a change in the pivot angle α front the vertical axis of canister 12.

Figure 2:
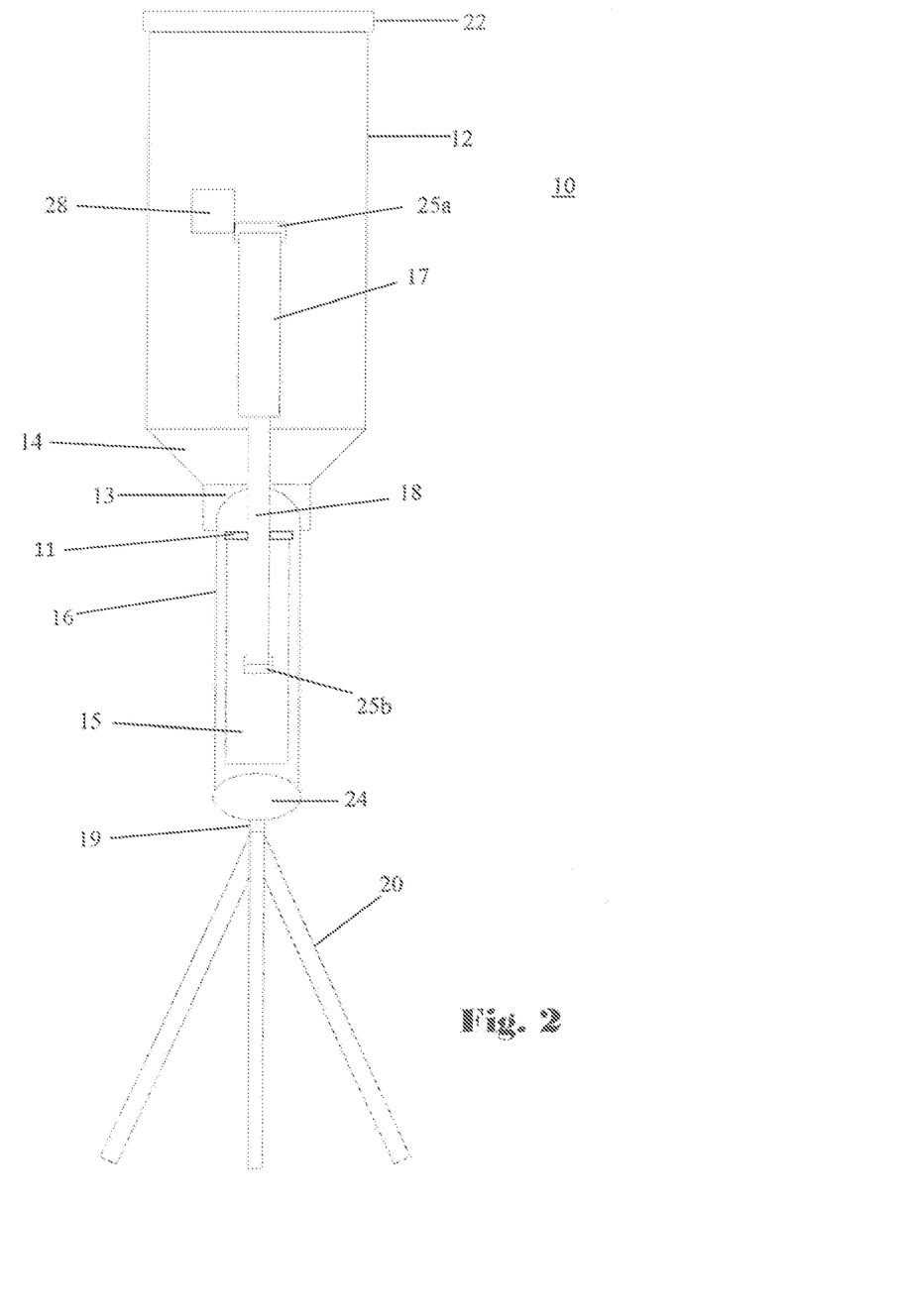
FIG. 2 is a front view of the gravity flow feeder in its closed position as shown in FIG. 1.

As can be best seen in FIGS. 1 and 2, a support bar 19 and legs 20 are provided for standing the feeder 10 at an adequate height to facilitate desired animals access to the feed contained within cavity 23 when access 15 is in its open condition. Support bar 19 and legs 20 may further be adjustable to allow height adjustment to suit desired height as well as fine tuning of the orientation of legs 20 upon uneven surfaces to maintain the feeder 10 in an upright position. It is also foreseeable that feeder 10 be also installed upon stationary support structures, such as trees, fencing, posts, or other relatively stable structures which may support the weight of the feeder in a stable condition.

Figure 4:
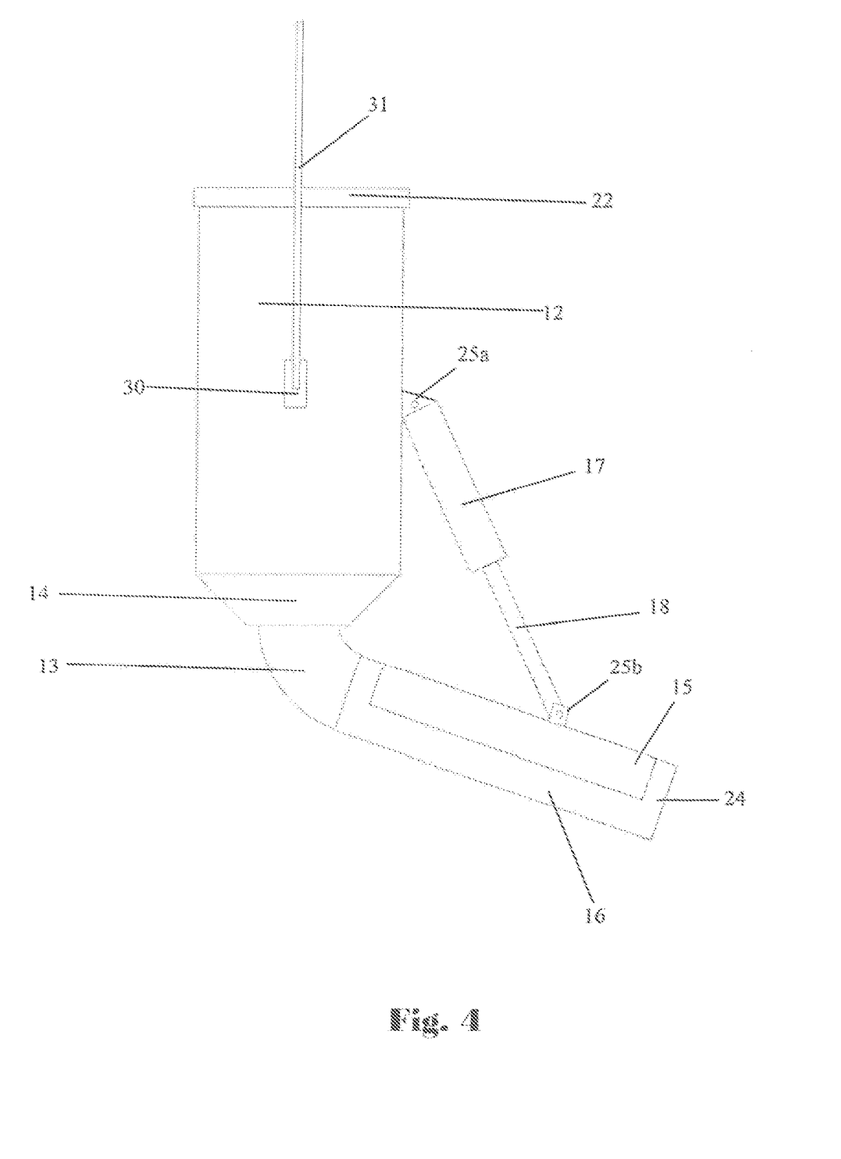
FIG. 4 is a side view of the gravity flow feeder having a hanging support.

As shown in FIG. 4, the gravity flow feeder 10 may alternatively supported by conventional hanging support. In such alternative embodiment, the canister 12 of feeder 10 may be provided with support couplings 30 such as brackets, pad-eyes, hooks, clamps, or other fastening means conventional in the art for catching and holding lengths of line or cable 31. Cable 31, in turn, can be fastened upon a structure above feeder 10 to allow for feeder 10 to hang down at a desired height above the ground. Though coupling 30 is shown in FIG. 4 as being positioned toward the middle of canister 12, it is felt that it would be understood that any number of couplings 30 can be positioned upon feeder 10 in varying orientation as would be necessary to provide support and balance for feeder 10 in its hanging position.

Referring to FIGS. 1-4, a timing mechanism 28 may be provided for triggering the actuation of cylinder 17 to open or close the access 15. Timing mechanism 28 may be any conventional digital or analog timer conventional in the art and may run on solar or conventional batteries. In order to provide conditioning of deer and other desired animals to approach feeder 10 during daylight hours, timing mechanism 28 can be programmable to trigger the cylinder 17 to open the access 15 at desired times or upon sensing of daylight through a solar cell (not pictured), wherein access 15 may be closed at another desired time or as evening approaches and the light coverage wanes upon the solar cell (not pictured). Functioning in such a manner, the desired animal to be attracted can only access the feed within cavity 23 of feeder 10 at the times dictated by a user through the timing mechanism 28 and a feeding schedule for the animal may be formed.

Figure 5:
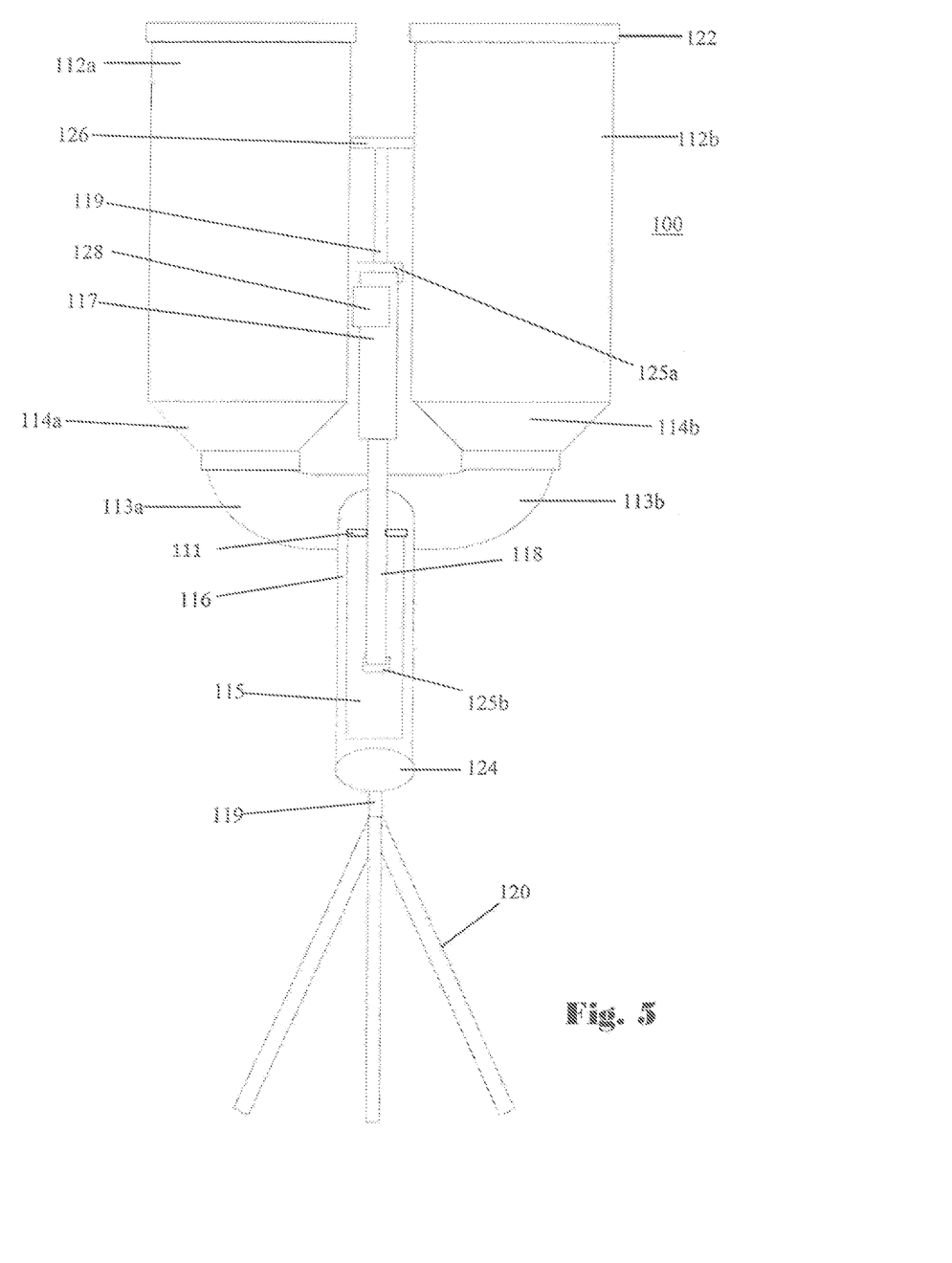
FIG. 5 is a front view of an alternate embodiment two container gravity flow feeder of the present invention in its closed position.

Now referring to FIG. 5, an alternate embodiment multi canister gravity flow feeder 100 is shown. Gravity flow feeder 100 is comprised of first canister 112a and second canister 112b having funnels 114a, 114b and curved chutes 113a, 113b interconnected to deposit feed into trough 116. Canisters 112a, 112b, funnels 114a, 114b, and curved chutes 113a, 113b are vertically orientated in relation to trough 116 to allow for gravity to naturally pull feed from canisters 112a, 112b, through funnels 114 and chutes 113, to finally settle within trough 116. Chutes 113a, 113b may each be further angled downward towards trough 116 to further drive the gravity flow of feed into trough 116.

Canisters 112a, 112b are envisioned as a hollow substantially cylindrical containers in which animal feed may be stored. A canister lids 122 are provided for allowing canisters 112a, 112b to be opened near their top for deposit of feed within canisters 112a, 112b. Canisters 112a, 112b may be closed by affixing lids 122 upon canisters 112a, 112b by means of screw top, plug and hole, snap fit, or other engagement conventional in the art. Providing lid 122 allows for easy allocation of feed within canisters 112a, 112b while protecting the contained feed from exposure to the elements and scavenging by wild animals.

Funnels 114a, 114b is provided at the bottom of canisters 112a, 112b with inwardly tapered surfaces to direct the passage of feed from the larger dimensioned canisters 112a, 112b into curved chutes 13a, 13b. Chutes 113a, 113b are generally cylindrical and further designed with a curvature an inwardly oriented downward taper to direct feed down and into trough 116. The limited size of both funnels 114a, 114b and chutes 113a, 113b provide for restricting the amount of feed passing from canisters 112a, 112b and there through into trough 16 to allow for only desired quantities of feed to be fed into trough 116. Chutes 113a, 113b may further be formed as a single U-shaped chute 113 to interconnect the funnels 114a, 114b.

Trough 116 is a generally cylindrical container comprised of an upper end affixed at the lower end of the intersection between chutes 113a and 113b, a pivotal access 115, an internal cavity 123, and an upward projecting lip 124 at its lower end. Trough 116 is outwardly projected from chutes 113a, 113b at a desired horizontal angle and vertically slanted from the vertical axis of canisters 112a, 112b provide desired animals with adequate space to approach and graze upon feed within trough 116 without being constrained by the canisters 112a, 112b, funnels 114a, 114b, and chutes 113a, 113b above trough 116.

Cavity 123 is designed with a smooth inner surface to promote the sliding of feed within, wherein the upward projection of lip 124 provides an end to trough 116. Feed sliding within trough 16 may abut and back up within cavity 123 filling the trough 116. Trough 116 is oriented at a slight downward angle as to promote the sliding and settling of feed within trough 116 by gravity. As animal feed is fed down through canisters 112a, 112b, through funnels 114a, 114b and chutes 113a, 113b, and into cavity 123 of trough 116, the feed will be stopped by lip 124 and back up inside the trough 116, wherein the pressure of the settled feed within trough 116 will press back against the flow of feed from canister 112, causing the cessation of gravity feeding.

Figure 6:
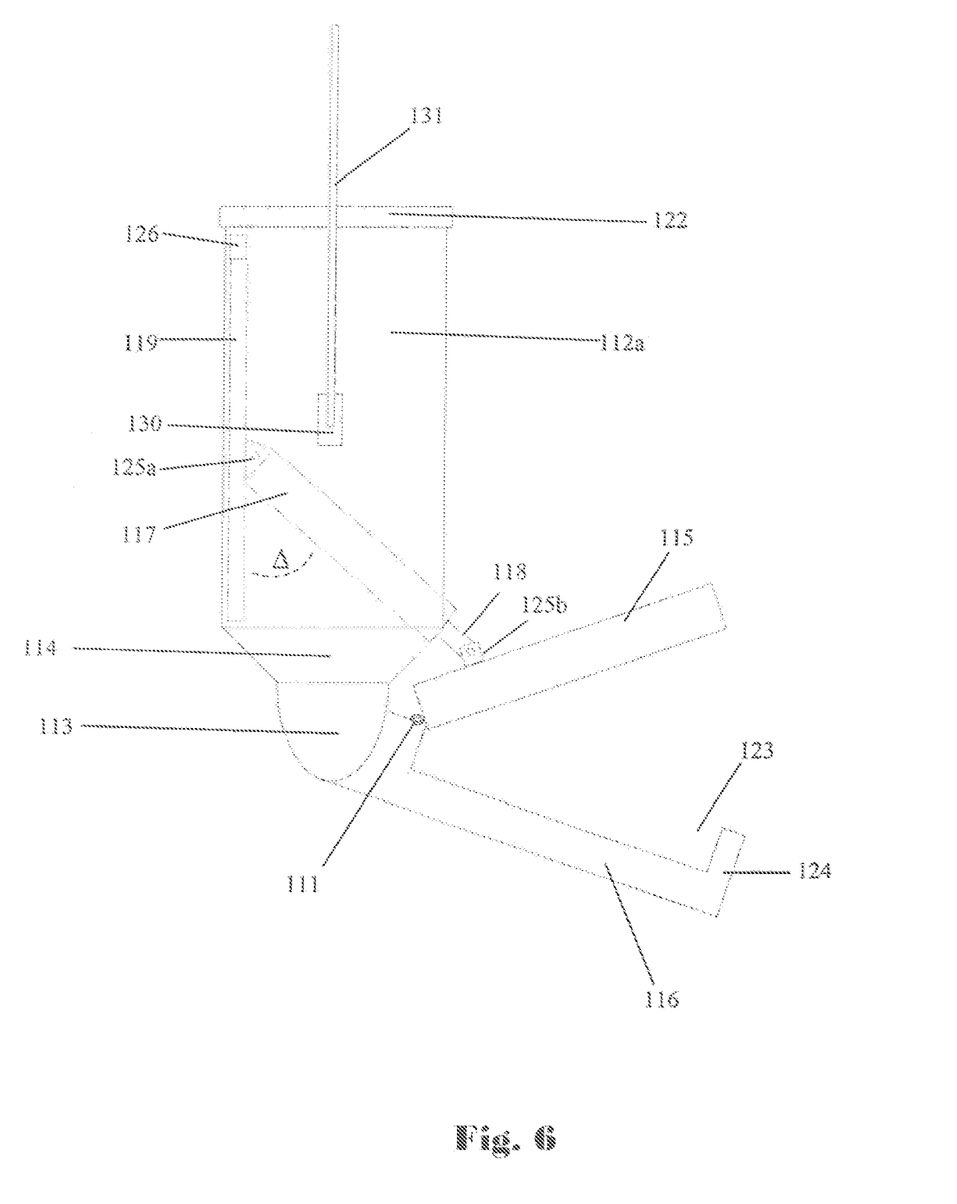
FIG. 6 is a side view of the two container embodiment of the gravity flow feeder in its open position.

Now referring to FIG. 6, access 115 is pivotally attached to trough 16 above cavity 123 by a hinge 11 as to allow for the opening and closing of cavity 123 and thus the respective uncovering and securing of the feed housed within. To facilitate the opening and closing of access 115 an articulating cylinder 117 and internal piston 118 are provided which are pivotally affixed between support bar 119 and access 115 by means of pivotal hinges 125a and 125b. It is envisioned that cylinder 117 could be driven by pneumatic or hydraulic internal cylinder pressures and could operate as a single or double acting cylinder. By retraction of internal piston 118 into cylinder 117, access 115 will be drawn upward, pivoting upon hinge 111, to expose cavity 123 of trough 116 and thus reveal the feed contained within trough 116. Inversely, extension of piston 118 out of cylinder 117 will drive the access 115 downward to close the access 115 over cavity 123 thus securing the feed within trough 116 from the elements and undesired animals. The pivotal nature of hinges 125a, 125b allow for cylinder 117 and piston 118, respectively, to pivot in reaction to piston 118 moving into and out of cylinder 117 which in turn causes access 115 to open or close, thus causing a change in angle Δ from the vertical axis of support bar 119.

As can be best seen in FIG. 5, a support bar 119 and legs 20 are provided for standing the feeder 100 at an adequate height to facilitate desired animals access to the feed contained within cavity 123 when access 115 is in its open condition. Support bar 119 is provided as a structure upon which pivotal hinge 125a of cylinder 117 may articulably engage against during extension and retraction of piston 118 to open and close the access 115. Support bar 119 and legs 120 may be adjustable to allow height adjustment to suit desired height as well as fine tuning of the orientation of legs 120 upon uneven surfaces to maintain the feeder 100 in an upright position. It is also foreseeable that feeder 100 be also installed upon stationary support structures, such as trees, fencing, posts, or other relatively stable structures which may support the weight of the feeder 100 in a stable condition.

A cross member 126 is provided for the purpose of facilitating the attachment of canisters 112a and 112b to each other and to support bar 119. Cross member 126 may be integral to support bar 119 or may be secured separately by any conventional means of secure attachment, such as screw, bolt, or clamping. The attachment of canisters 112a and 112b to cross member 126 may further be any conventional means of secure attachment, such as screw, bolt, or clamping.

As shown in FIG. 6, the gravity flow feeder 100 may alternatively supported by conventional hanging support. Similar to the embodiment shown in FIG. 5, a support bar 119 is provided as a structure upon which pivotal hinge 125a of cylinder 117 and cross member 126 may be maintainedly engaged, wherein cylinder 117 may articulably engage against and which cross member 126 may attach and support the canisters 112a, 112b together. In such alternative embodiment, the canisters 112a, 112b of feeder 100 may be provided with support couplings 130 such as brackets, pad-eyes, hooks, clamps, or other fastening means conventional in the art for catching and holding lengths of line or cable 131. Cable 131, in turn, can be fastened upon a structure above feeder 100 to allow for feeder 100 to hang down at a desired height above the ground. Though coupling 130 is shown in FIG. 6 as being positioned toward the middle of canisters 112a, 112b, it is felt that it would be understood that any number of couplings 130 could be positioned upon feeder 100 in varying orientation as would be necessary to provide support and balance for feeder 100 in its hanging position.

Referring to FIGS. 5 and 6, a timing mechanism 128 may be provided for triggering the actuation of cylinder 117 to open or close the access 115. Timing mechanism 128 may be any conventional digital or analog timer conventional in the art and may run on solar or conventional batteries, in order to provide conditioning of deer and other desired animals to approach the feeder 100 during daylight hours, timing mechanism 128 can be programmable to trigger the cylinder 117 to open the access 115 at desired times or upon sensing of daylight through a solar cell (not pictured), wherein access 115 may be closed at another desired time or as evening approaches and the light coverage wanes upon the solar cell (not pictured). Functioning in such a manner, the desired animal to be attracted can only consume the feed within cavity 123 of feeder 100 at the times dictated by a user through the timing mechanism 128 and a feeding schedule for the animal may be formed.

In operation, the deposit of feed from canisters 112a, 112b through funnels 114a, 114b into chutes 113a, 113b will meet and commingle the feed flowing into trough 116. Gravity flow is advantageous for proper mixing of feed as when the feed from each canister 112a, 112b slidingly meet at the intersection of chutes 113a, 113b the descending feed will naturally mix as it enters trough 116. This provides for an ease of feed mixing without the necessity of a user mixing the feed prior to filling the canisters 112a, 112b. Given the relative symmetry of feeder 100 and the funneling nature of its design, the feed entering the trough 116 will be evenly mixed and distributed as it settles within cavity 123.

For ease of understanding FIGS. 5 and 6 depict two canisters 112a and 112b. It should be well understood that multiple canisters 112, such as three, four, or even more, may be added to deposit and mix feed into trough 116 without departing from the spirit and scope of the invention. In such multiple canister embodiment, the pivotal hinge 125a attaching the cylinder 117 may be fastened to either a central canister to the arrangement, similar to that depicted in FIG. 3 of the single canister embodiment, or to support bar 119 or cross member 126, as shown in FIG. 6, in order to allow for the articulation of cylinder 117 to open or close the access 115.

It is thought that the gravity flow feeder apparatuses 10, 100 presented herein as well as their attendant advantages will be understood from the foregoing description. It is also thought that it will be apparent that various changes may be made in the form, construction, and arrangement of the parts thereof without departing from the spirit and scope of the invention or sacrificing all of its material advantages, the form herein being merely examples of embodiments of the invention. It is thought that it would be well known that the canisters 12, 112a, and 112b, funnels 14, 114a, 114b, curved chutes 13, 113a, 113b, and troughs 16, 116 could be of varying sizes and any assortment of shapes, such as cubic, conical, or other hollow three dimensional polygonal shapes to suit the desired gravity flow of the feeder 10, 100. It is also thought it would be apparent that feeder 10, 100 may also be implemented in the feeding of other desired animals, such as in the feeding of livestock and poultry or in the industries of animal rearing and ranching.

I claim:

1. A gravity flow animal feeder, comprising:
   a. a canister having an upper and lower end;
   b. a funnel having an upper and lower end, said upper end of said funnel attached to said canister at said lower end of said canister;
   c. a chute having an upper and lower end, said upper end of said chute attached to said lower end of said funnel;
   d. a trough attached to said lower end of said chute, said trough having an internal cavity, wherein said canister, said funnel, said chute, and said trough are engaged to allow for the passage of feed there through;
   e. an access in said trough, said access being pivotally articulable between an open and closed position;
   f. a cylinder having a piston movable therein, said cylinder attached to said access, said cylinder being articulable for extending and retracting said piston for pivotally opening and closing said cavity; and
   g. a timing mechanism for triggering said cylinder to open and close said access.

2. The gravity flow animal feeder of claim 1, wherein said funnel is inwardly tapered to control feed flow from said canister to said trough.

3. The gravity flow animal feeder of claim 2, wherein said trough is arranged at a downward angle from said chute and comprises a lip for containing feed.

4. The gravity flow animal feeder of claim 3, wherein said cylinder is pivotally attached between said canister and said access.

5. The gravity flow animal feeder of claim 4, further comprising:
   a. a support bar fixedly attached to said canister; and
   b. legs adjustably attached to said support bar for maintaining said canister and said trough in an upright and supported position.

6. A gravity flow animal feeder, comprising:
   a. a canister having an upper and lower end;
   b. a funnel having an upper and lower end, said upper end of said funnel attached to said canister at said lower end of said canister, said funnel being inwardly tapered to control feed flow;
   c. a chute having an upper and lower end, said upper end of said chute attached to said lower end of said funnel;
   d. a trough attached to said lower end of said chute, said trough having an internal cavity, said trough arranged at a downward angle from said chute, wherein said canister, said funnel, said chute, and said trough are engaged to allow for the passage of feed there through;
   e. an access in said trough, said access being pivotally articulable between an open and closed position;
   f. a cylinder having a piston movable therein, said cylinder attached to said access, said cylinder being articulable for extending and retracting said piston for pivotally opening and closing said cavity; and
   g. a timing mechanism for triggering said cylinder to open and close said access.

7. The gravity flow animal feeder of claim 6, wherein said cylinder is pivotally attached between said canister and said access.

8. The gravity flow animal feeder of claim 7, further comprising legs attached to said canister for maintaining said canister and said trough in an upright and supported position.

* * * * *